United States Patent [19]

Greiner et al.

[11] 4,426,981

[45] Jan. 24, 1984

[54] APPARATUS FOR DETECTING THE FUEL QUANTITY DELIVERED TO THE COMBUSTION CHAMBERS OF A DIESEL ENGINE

[75] Inventors: Max Greiner, Gerlingen; Helmut Laufer; Max Straubel, both of Stuttgart, all of Fed. Rep. of Germany

[73] Assignee: Robert Bosch GmbH, Stuttgart, Fed. Rep. of Germany

[21] Appl. No.: 295,172

[22] Filed: Aug. 21, 1981

[30] Foreign Application Priority Data

May 9, 1981 [DE] Fed. Rep. of Germany ....... 3118425

[51] Int. Cl.$^3$ ............................................. F02M 65/00
[52] U.S. Cl. ..................................... 123/488; 123/494; 123/501; 123/569; 73/119 A
[58] Field of Search ............... 123/494, 488, 357, 501, 123/497, 569; 73/119 A

[56] References Cited

U.S. PATENT DOCUMENTS

| | | | |
|---|---|---|---|
| 3,511,088 | 5/1970 | Weaver | 73/119 A |
| 3,796,197 | 3/1974 | Locher et al. | 123/357 |
| 4,012,948 | 3/1977 | Kuno et al. | 73/119 A |
| 4,033,310 | 7/1977 | Nicolls | 123/501 |
| 4,130,013 | 12/1978 | Bailey et al. | 73/119 A |
| 4,279,235 | 7/1981 | Flaig et al. | 123/569 |
| 4,337,650 | 7/1982 | Brandt | 73/119 A |

Primary Examiner—Andrew M. Dolinar
Attorney, Agent, or Firm—Edwin E. Greigg

[57] ABSTRACT

A fuel quantity measuring apparatus, preferably for a Diesel engine, is proposed in which the course of the fuel pressure is evaluated. A specialized pressure gradient of a first polarity marks the onset of supply or injection, and the maximum of the pressure gradient of the other polarity represents the end of injection or supply. The question of which designation prevails, whether injection onset and end or supply onset and end, is determined by the measurement location, that is, whether it is in the direction of the injection valve or in the direction of the supply element of the fuel supply pump. The injection quantity, for example, may be determined via the integral of the pressure during the metering period. It is recommended, when a piezoelectric pressure receptor is used, that a resistor-capacitor element be switched parallel thereto.

11 Claims, 5 Drawing Figures

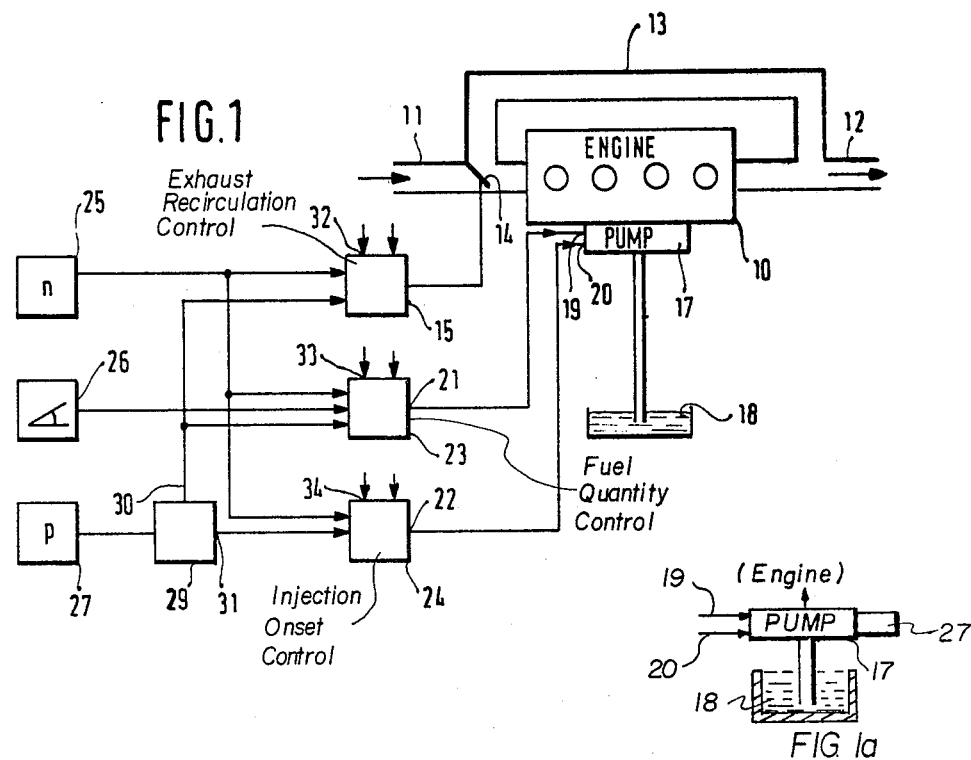
FIG.1
FIG. 1a
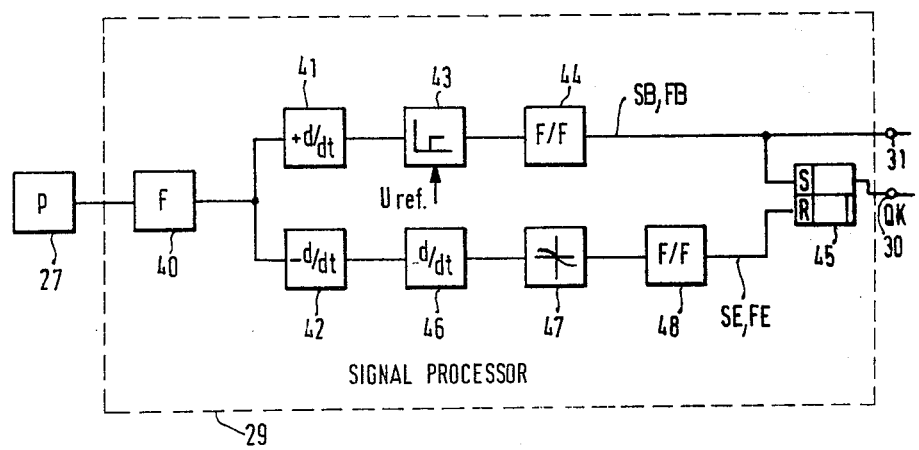
FIG.3

4,426,981

APPARATUS FOR DETECTING THE FUEL QUANTITY DELIVERED TO THE COMBUSTION CHAMBERS OF A DIESEL ENGINE

BACKGROUND OF THE INVENTION

The invention is based on an apparatus for detecting the fuel quantity delivered to the combustion chambers of a Diesel engine. In the specification for prior art apparatus, it is stated that not only is the height of the pressure in a fuel line leading to the injection valves important for diagnostic purposes, but also the instant of appearance of pressure pulses which provide information as to the instant of fuel injection. The same is true for the duration of a pressure pulse, on the basis of which it is possible to ascertain the injection quantity per injection procedure if the injection pressure is known. Finally, the frequency of the pressure pulses repesents a standard for the rpm of the internal combustion engine.

With a view to the desired regulation of an injection nozzle's injection onset or of the supply onset of an injection pump, as well as of the injected fuel quantity, strenuous efforts must be made to detect these values as precisely as possible. In the known apparatus the individual pressure signals are evaluated in direct fashion for this purpose. However, it has been demonstrated that the known diagnostic apparatus is not always capable of producing satisfactory results for all operational states; for instance, resonance in the pressure lines causing sound and pressure line resonance signals and scattered interference cause measurement errors.

OBJECT AND SUMMARY OF THE INVENTION

The apparatus according to the invention for detecting the fuel quantity delivered to the combustion chambers of a Diesel engine has the advantage over the prior art that precise measurement results are produced at all times, and thus good results are attained in controlling the engine.

The invention will be better understood and further objects and advantages thereof attained in accordance with the dependent claims will become more apparent from the ensuing detailed description of a preferred embodiment taken in conjunction with the drawings.

BRIEF DESCRIPTION OF THE DRAWINGS

FIG. 1 is a block circuit diagram of the control systems of a Diesel engine according to a preferred embodiment of the pesent invention;

FIG. 1a is a schematic diagram showing one position of the pressure transducer;

FIG. 3 shows a detailed diagram in block form of preferred circuit embodiment of the subject of FIG. 1.

DESCRIPTION OF THE PREFERRED EMBODIMENT

Figure 2:
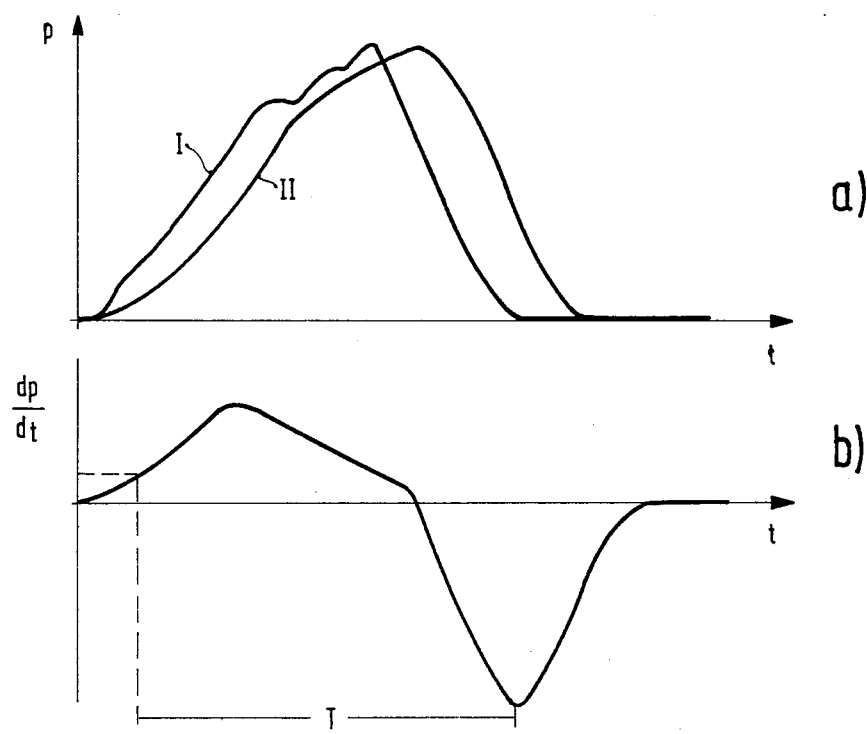
FIG. 2 shows two time diagrams for the purpose of explaining the invention.

In schematic form, FIG. 1 illustrates an internal combustion engine with self-ignition, together with its most important electronic control devices. An air intake tube 11 leads toward the internal combustion engine 10 itself, and an exhaust gas tube 12 leads away from it. An exhaust recirculation line is indicated by reference numeral 13. The component of fresh air and exhaust gas delivered to the engine 10 is established by means of a mixture valve 14, which receives its trigger signal via an exhaust recirculation control circuit 15.

The engine 10 is supplied with fuel from a tank 18 via a fuel pump 17. The pump itself has two control inputs 19 and 20 for the fuel quantity and the supply onset, respectively. In corresponding fashion, these two control inputs 19 and 20 are connected with the signal outputs 21 and 22 of a quantity control circuit 23 and an injection onset control circuit 24.

For the exemplary embodiment, the important input variables of the apparatus as a whole are the rpm, the position of the driving pedal and a pressure signal pertaining to the fuel to be injected. The output signal of an rpm sensor 25 accordingly proceeds to corresponding inputs of the exhaust recirculation control circuit 15, the fuel quantity control circuit 23, and the injection onset control circuit 24. A signal for throttle valve position arrives from a corresponding sensor 26 and is switched to the fuel quantity control circuit 23. A pressure sensor 27 for detecting the fuel pressure emits its output signal to a signal processing circuit 29, which will be described in greater detail in connection with FIG. 3. This circuit 29 has two outputs 30 and 31 for the injected fuel quantity and the injection onset. In corresponding fashion, these outputs 30 and 31 are connected with the exhaust recirculation control circuit 15, the fuel quantity control circuit 23 and the injection onset control circuit 24. All three control circuits 15, 23 and 24 have still further inputs 32, 33 and 34, by way of which the individual values can additionally be influenced.

Figure 1B:
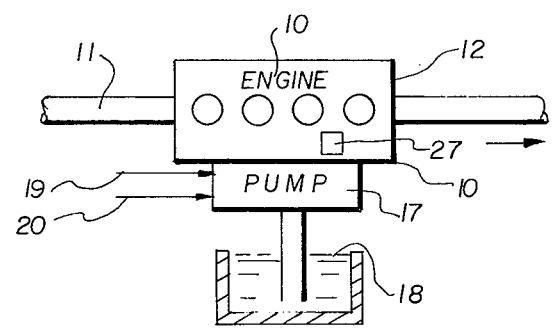
FIG. 1b is a schematic diagram showing yet another position of the pressure transducer.

The invention has the object of setting the injection onset and the injected fuel quantity on the basis of the pressure in the pumping element as shown by the position of the pressure transducer 27 adjacent the fuel pump 17 in FIG. 1a, or in the fuel lines leading to the location of injection as shown schematically by the position of the pressure transducer 27 between the cylinders of the engine 10 and the pump 17 in FIG. 1b.

FIG. 2a illustrates a pressure course of this kind in curve I. Because of the severe fluctuations which are caused by inherent physical properties, it proves to be necessary to filter this pressure signal, so that finally it is the course represented by curve II of FIG. 2a which is evaluated.

The question of where the pressure sensor will be located in the fuel line must be decided by weighing various considerations. If the most precise possible measurement results are desired, then the pressure sensor will be disposed as close as possible to the injection nozzle. This is important especially with a view to regulating the injection onset. On the other hand, is the pressure sensor is disposed at this location, there will be measurement adulteration in the pressure sensor signal as the result of pressure fluctuations, so that under some circumstances the pressure duration signal does not provide a very exact measurement signal for the fuel quantity.

On the other hand, the best measurement result for the injected fuel quantity is attained if the course of pressure is picked up at the pump. What is actually detected with this measurement location is then the fuel supply, and not so much the fuel metering, at the injection valve; the difference is that the actual injection onset follows the supply onset by a very small, but not always negligible, amount of time.

The course of pressure illustrated in FIG. 2a is derived from a pressure sensor disposed on the pump. In the preferred case, the signal is filtered (at a threshold frequency of 0.6 to 1.0 kHz, for instance).

It is essential that the injected fuel quantity be ascertained via the filtered and derived pressure signal; the injection onset is detected via a threshold value in the differentiated signal, and the end of injection is detected via the detection of the negative extreme value in the signal dp/dt. This is shown in FIG. 2b. The invention is based upon the recognition that a very severe variation in pressure occurs with the onset of pressure relief, by opening of the diversion cross section, for instance, at the end of supply; this pressure variation represents a maximum, compared with the other variations in pressure which occur.

Serving the purpose of illustrating a technical embodiment of this manner of detecting the injection quantity is the block circuit diagram given in FIG. 3 for the signal processing circuit 29 of FIG. 1. The pressure sensor is followed here by a filter 40 for suppressing normal sound and pressure line resonance signals; the output of the filter 40 leads to two different differentiation elements 41 and 42 for positive and negative inclinations. The differentiation element 41 is followed by a threshold value switch 43 and finally by a monostable multivibrator 44. The output signal of this monostable multivibrator 44 arrives at both the output 31 of the signal generating or signal processing circuit 29 and the set input of an S-R flip-flop 45.

By way of this branch of the signal processing circuit 29, the injection onset is detected in such a manner that, as shown in FIG. 2b, a certain threshold is picked up in the positive component of the pressure gradient. If this threshold has been attained, then subsequently the monostable multivibrator 44 is triggered, and it emits a corresponding signal at the output 31 as the identifying mark of the injection onset.

The end of the injection process is ascertained via the second differentiation element 42 for the negative pressure gradient, which is followed by a further differentiation circuit 46. The output signal of this circuit 46, in accordance with the definition of the second derivation, has a zero passage at the location of the highest pressure gradient; this zero passage is picked up by means of a zero passage detection circuit 47 such as a Schmidt trigger which in, turn triggers a monostable multivibrator 48. On the output side, this monostable multivibrator 48 is connected with the reset input of the flip-flop 45. At the non-inverting output of the flip-flop 45, a signal for the duration of injection is then obtained. This signal is available for use at the output 30 of the signal processing circuit 29 of FIG. 1, and given appropriate evaluation, by way of a performance graph as needed, it serves as an injection quantity signal.

It is also efficacious to form the integral via the course of pressure between the onset and end of the injection time, which likewise produces a good measurement signal depending upon the location of the pressure sensor.

Simple piezoelectric pressure sensors have proved to be particularly suitable because they are not overly sensitive and because of their compact structure and precision of operation. As a result, possible drifting in the zero point of this type of pressure sensor remains essentially of no consequence. In this respect, it has proved to be efficacious for a resistor-capacitor combination to be switched parallel to the piezoelectric pressure sensor. A parallel circuit of a resistor and a capacitor is particularly appropriate in this case.

Measurement results have demonstrated that reliably constant signals can be obtained with the apparatus according to the invention. Differences in the injection system, such as divergences from one pump to another, play in the throttle tang caused by sooting up of the nozzles, and changes in the nozzle opening pressure proved to have almost no influence on the result of measurement.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An apparatus for detecting the fuel quantity delivered to the combustion chambers of a Diesel engine comprising:
   a fuel pressure sensor for producing a pressure signal,
   a circuit processing means connected to said sensor for recognizing an onset control function and end of control function of one control procedure, said means including,
   first differentiating means responsive to said pressure signal and producing a threshold value signal of a first derivation serving as said onset of said control procedure, and a second differentiating means for twice differentiating said pressure signal serving as said end of said control procedure, and
   a time duration-detection means connected to said first and second differentiating means for detecting fuel quantity as the duration of time elapsing between said onset and said end of said control procedure.

2. An apparatus as defined by claim 1, wherein said fuel pressure sensor is for the detection of the injection time and disposed as close as possible to said combustion chambers.

3. An apparatus as defined by claim 1, wherein said fuel pressure sensor is disposed between said pump and said combustion chambers.

4. An apparatus as defined by claim 1, wherein said fuel pressure sensor is for measuring the duration of supply and is disposed on said pump.

5. An apparatus as defined by claim 1, wherein said circuit processing means provides a fuel quantity signal to an exhaust recirculation control means.

6. An apparatus as defined by claim 5, wherein said pressure signal is processed as an actual value provided to a fuel quantity regulation means.

7. An apparatus as defined by claim 1, wherein a filter is disposed subsequent to said fuel pressure sensor.

8. An apparatus as defined by claim 1, wherein a piezoelectric pressure transducer is provided as said fuel pressure sensor.

9. An apparatus as defined by claim 1, wherein said signal corresponding to said onset is provided to an onset regulation means.

10. A device according to claim 1 wherein said control procedure is a fuel injection procedure.

11. A device according to claim 1 wherein said control procedure is a fuel supply procedure.

* * * * *